Patented Mar. 31, 1953

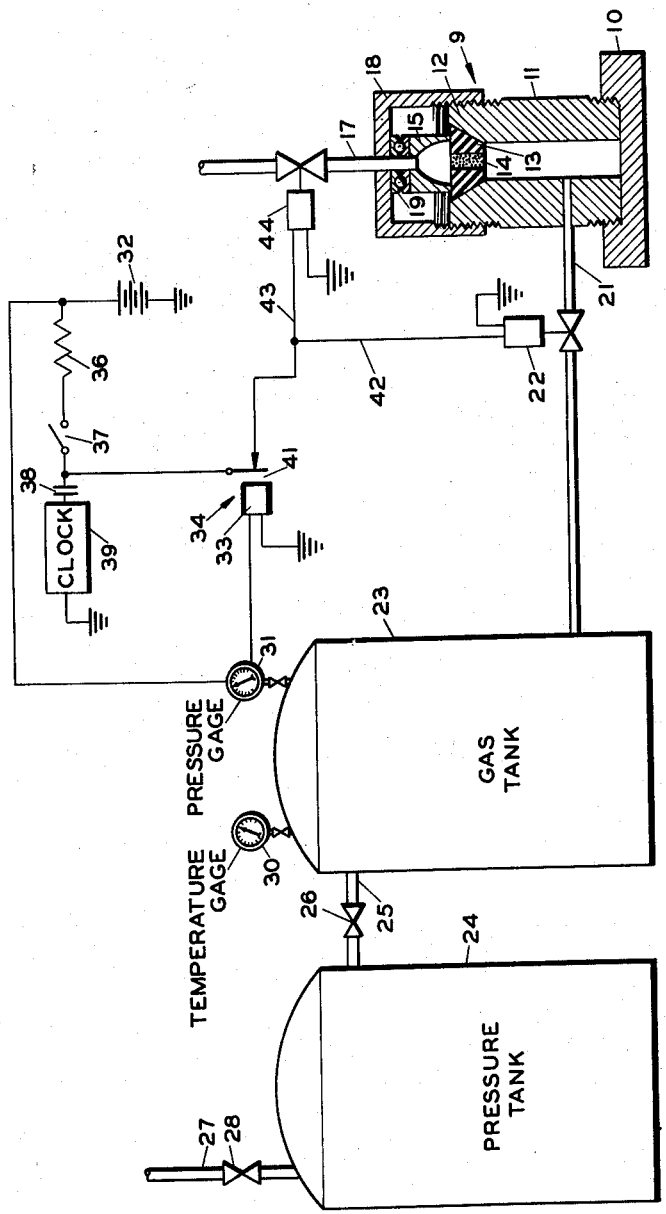

2,633,015

UNITED STATES PATENT OFFICE 2,633,015

PORTABLE PERMEAMETER

William L. Morris, Bartlesville, Okla., assignor to Phillips Petroleum Company, a corporation of Delaware Application October 11, 1948, Serial No. 53,927

3 Claims. (Cl. 73—38)

This invention relates to a method of measuring the permeability of cores. In another aspect, it relates to an improved portable permeameter.

Heretofore, permeability measurements of cores taken from drill holes have ordinarily been made in the laboratory by passing a fluid, such as water or carbon dioxide, through the core at a measured constant rate. By measuring the time and rate of flow of fluid, the permeability of the core can be calculated in permeability units. It is difficult, however, to provide apparatus for maintaining a constant flow rate in the field and, in addition, laborious calculations are necessary to determine the permeability of the core after the measurements have been taken.

It is an object of this invention to provide apparatus for determining the permeability of cores which is light and readily transportable to and operable in the field.

It is a further object of the invention to provide an improved method of measuring permeability.

It is a still further object of the invention to provide apparatus for accurately measuring the time taken for the pressure of test fluid in a reservoir to drop a predetermined amount, as fluid passes from the reservoir through the core whose permeability is to be tested.

It is a still further object to provide apparatus which is rugged in construction, reliable in operation, economical to manufacture, and which can be constructed from standard components.

Various other objects, advantages and features of the invention will become apparent from the following detailed description taken in conjunction with the accompanying drawing, in which:

The figure is a view illustrating the apparatus of this invention.

Referring now to the drawing in detail, the apparatus comprises a core holder 9 including a generally cup-shaped member defined by a base 10 and a tube 11 screwed threaded thereto. A generally frusto-conical upper end portion 12 is provided on the tube 11 and a frusto-conical gasket 13 is seated in this top portion, the gasket having an axial passage formed therein for receiving a core 14 to be tested. A hollow member 15 is disposed at the top of gasket 13, this member receiving the fluid discharged through the core 14 and feeding it to an outlet or discharge conduit 17. A cap 18 is screw threaded on the tube 11 and a roller bearing 19 is positioned between the cap 18 and the member 15 so that the cap may be screwed down tightly after the core is inserted into the holder, thereby to effect intimate engagement of the resilient gasket 13, the frusto-conical portion 12, and the core 14.

Test fluid is supplied to the interior of tube 11 by a line 21 which is controlled by a solenoid-operated valve 22 and which communicates with a gas tank or pressure reservoir 23. The reservoir 23, in turn, communicates with a pressure tank 24 through a line 25 which is controlled by a valve 26. Test fluid may be admitted to pressure tank 24 through a conduit 27 which is controlled by a valve 28. Preferably, I utilize carbon dioxide as the test fluid although other fluids may be used in certain applications of the invention. The pressure tank 24 is provided so that the pressure within reservoir 23 may be built up to a desired value before the testing operation is started.

The reservoir 23 is also provided with a temperature gauge 30 and a combined pressure gauge and pressure switch 31. The pressure switch may be of any well known construction and its function is either to open or close a set of contacts when the pressure within reservoir 23 drops to a predetermined value. The contacts of pressure switch 31 are connected in series with a battery 32 and an operating coil 33 of a relay 34. The battery 32 is also connected in circuit with a resistor 36, a switch 37, a condenser 38, and a control unit of an electrically controlled clock 39, all these parts being connected in series circuit arrangement. Relay 34 is provided with a set of normally closed contacts 41 and one of these contacts is connected in circuit with switch 37, resistor 36, and battery 32, the other contact being connected by leads 42, 43 to the energizing winding of solenoid-operated valve 22 and to the energizing winding of a solenoid-operated valve 44, respectively, the valve 44 controlling the outlet line 17 of the core holder. Thus, it will be apparent that the solenoid units 22, 44 are connected in parallel with each other and in series with contacts 41, switch 37, resistor 36, and battery 32.

The operation of the invention will now be apparent to those skilled in the art. A core is inserted in the holder 9 with solenoid valves 22, 44 closed, and the pressure within reservoir 23 is built up to a suitable predetermined value, preferably about 15 pounds per square inch gage. Thereupon, switch 37 is closed with the result that condenser 38 is charged and a pulse of current passes through a control unit for clock 39 to initiate operation thereof. The clock may desirably consist of a stop watch associated with an electromagnetic control device so that one voltage pulse initiates operation of the watch while another voltage pulse discontinues the operation thereof. Closure of switch 37 also energizes solenoid valves 22, 44 thereby permitting test fluid to flow from reservoir 23 through inlet 21, core 14, and outlet 17. As the flow of fluid continues, the pressure within reservoir 23 drops until a predetermined value is reached at which pressure switch 31 is actuated to complete a circuit through battery 32 and relay 34. This lower predetermined pressure may be about 5 pounds per square inch. The resultant actuation of relay 34 opens contacts 41 with the result that solenoid valves 22, 44 are de-energized, thereby closing inlet 21 and outlet 17. The opening of relay contacts 41 also changes the resistance in series with battery 32, condenser 38, and timer 39. As a result another voltage pulse passes through clock 39 to discontinue the operation thereof. In this manner, I determine the pressure at the start of the test, the pressure at the conclusion of the test, and the time required for the pressure to drop from the former to the latter value.

With this information available, the permeability of the core may be readily calculated from the following equation:

$$t = \frac{2\mu LV}{P_2 KA}\left[ctnh^{-1}\frac{P(t)}{P_2} - ctnh^{-1}\frac{P(O)}{P_2}\right]$$

where $P = P(t) =$ pressure in tank at time $t$
$P_2 =$ Outside pressure
$\mu =$ Viscosity of gas
$L =$ Length of core
$V =$ Volume of gas tank
$K =$ Permeability
$A =$ Cross sectional area of core
$P(O) =$ Starting pressure in tank In order to avoid time consuming calculations in the field, a chart or graph may be used in connection with the testing apparatus so that the permeability may be read from the chart, once the test has been made. To this end, the temperature gauge 30 is utilized to indicate the temperature of the fluid within reservoir 23 and a suitable calibration chart is used to take into account the temperature factor.

It will be apparent that the method of my invention involves determination of the time required for the pressure within reservoir 23 to drop from a first predetermined value to a second predetermined value, as contrasted with prior testing methods wherein a constant rate of flow is maintained through the core at all times. Accordingly, it will be apparent that my method may be carried out without use of the described electrical circuit, although this novel circuit greatly facilitates the core testing operating and enables a testing speed to be obtained which has hitherto been unavailable. The apparatus is particularly well adapted for use in the field since pressure tank 24 may be filled with carbon dioxide gas at high pressure and, thereupon, several tests may be made before it is necessary to refill the pressure tank. It will also be apparent that successive tests may be rapidly made since it is only necessary to adjust valve 26 to obtain a pressure of 15 pounds per square inch in reservoir 23 before each test, and to replace the core 14 for each successive operation of the apparatus. Finally, the parts of the apparatus may be sufficiently small that the entire unit may be incorporated within a small space, for example, as in a suitcase.

While the invention has been described in connection with a present, preferred embodiment thereof, it is to be understood that this description is illustrative only and is not intended to limit the invention, the scope of which is defined by the appended claims.

Having described my invention, I claim:

1. Apparatus for testing the permeability of cores comprising, in combination, a core holder having an inlet and an outlet for test fluid, a reservoir for said fluid, a line connecting said reservoir and said inlet, a solenoid-operated valve in said line, a pressure switch communicating with said reservoir which is operable when the pressure therein drops to a predetermined value, a clock, a circuit including a current source for controlling the operation of said clock and said solenoid-operated valve, a switch in said circuit for starting said clock and opening said solenoid-operated valve, and means controlled by said pressure switch for de-energizing said clock when the pressure in said reservoir drops to a predetermined value.

2. Apparatus for testing the permeability of cores comprising, in combination, a core holder having an inlet and an outlet for test fluid, a reservoir for said fluid, a line connecting said reservoir and said inlet, a valve in said line, a pressure switch communicating with said reservoir which is operable when the pressure therein drops to a predetermined value, a clock, a circuit for controlling the operation of said clock including a resistor, a condenser, a switch, and a battery, all connected in series with an electrically actuated control unit for said clock, said unit alternately stopping and starting said clock when successive control pulses are fed thereto by said circuit, a normally closed relay, a circuit including said pressure switch, said current source, and the operating winding of said relay to open the relay contacts when the pressure in said reservoir drops to a predetermined value, a valve-operating solenoid winding for controlling said valve, and a circuit for connecting in series said solenoid winding, the contacts of said relay, said switch, said resistor, and said battery.

3. Apparatus for testing the permeability of cores comprising, in combination, a core holder having an inlet and an outlet for test fluid, a reservoir for said fluid, a line connecting said reservoir and said inlet, a solenoid-operated inlet valve in said line, a pressure tank, a line connecting said pressure tank and said reservoir, a valve in said line, a pressure switch communicating with said reservoir for opening an electric circuit when the pressure in said reservoir drops to a predetermined value, a solenoid-operated valve controlling the outlet of said core holder, a clock, a circuit for controlling the operation of said clock including a condenser, a switch, a resistor, and a battery, all connected in series with a control unit for said clock, said unit being constructed and arranged to alternately start and stop said clock when successive control pulses are fed thereto, whereby closure of said switch charges said condenser thereby producing a pulse of current to initiate operation of said clock, a normally closed relay having its actuating winding connected in series with said pressure switch and said battery whereby the relay contacts are opened when the pressure in said reservoir falls to a predetermined value, and a circuit connecting the valve solenoids in parallel with each other and in series with the contacts of said relay, said switch, said resistor, and said battery, whereby opening of said relay contacts produces a partial discharge of said condenser, thereby producing a pulse of current in the clock circuit to de-energize said clock.

WILLIAM L. MORRIS.

REFERENCES CITED

The following references are of record in the file of this patent:

UNITED STATES PATENTS

| Number | Name | Date |
| --- | --- | --- |
| 1,775,293 | Pfening et al. | Sept. 9, 1930 |
| 1,934,291 | Baas | Nov. 7, 1933 |
| 2,293,488 | Bays | Aug. 18, 1942 |
| 2,392,637 | Boehler | Jan. 8, 1946 |
| 2,460,655 | Rickmeyer | Feb. 1, 1949 |